(12) United States Patent
Wilking et al.

(10) Patent No.: US 8,135,665 B2
(45) Date of Patent: Mar. 13, 2012

(54) SYSTEMS AND METHODS FOR EXECUTING A DATABASE QUERY TO PERFORM MULTI-LEVEL DEPLOYMENT

(75) Inventors: Michael Wilking, Zuzenhausen (DE); Jeffery Majestic, Alpharetta, GA (US)

(73) Assignee: SAP AG, Walldorf (DE)

(*) Notice: Subject to any disclaimer, the term of this patent is extended or adjusted under 35 U.S.C. 154(b) by 295 days.

(21) Appl. No.: 12/588,487

(22) Filed: Oct. 16, 2009

(65) Prior Publication Data

US 2011/0093451 A1   Apr. 21, 2011

(51) Int. Cl.
*G06F 7/00* (2006.01)
*G06F 17/00* (2006.01)

(52) U.S. Cl. ........................................ 707/600; 707/944

(58) Field of Classification Search ........................ None
See application file for complete search history.

(56) References Cited

U.S. PATENT DOCUMENTS

| | | | |
|---|---|---|---|
| 6,965,867 B1 * | 11/2005 | Jameson | 705/7.12 |
| 7,249,179 B1 * | 7/2007 | Romero et al. | 709/226 |
| 8,005,778 B2 * | 8/2011 | Montgomery | 706/47 |
| 2005/0209732 A1 * | 9/2005 | Audimoolam et al. | 700/216 |
| 2006/0184484 A1 * | 8/2006 | Al-Otaibi et al. | 706/45 |
| 2008/0027769 A1 * | 1/2008 | Eder | 705/7 |

OTHER PUBLICATIONS

Miller et al, "Evaluating strategic capacity decisions: The use of a hierarchical production-planning system", Industrial Management + Data Systems. Wembley 1993. vol. 93, Issue. 9, p. 29 (6 pages).*

* cited by examiner

*Primary Examiner* — Uyen T. Le
(74) *Attorney, Agent, or Firm* — Finnegan, Henderson, Farabow, Garrett & Dunner LLP (57) ABSTRACT

Systems and methods for generating an optimized deployment scheme include generating a request identifying a type of resource requested by hierarchically arranged organizational entities including a first organizational entity located at a first level and a second organizational entity at a second level, executing a database query to retrieve business data corresponding to the first and second organizational entities, determining, based on the business data, a first quantity and a second quantity, the first quantity identifying a quantity of the resource available for deployment to the first organizational entity, and the second quantity identifying a quantity of the resource available for deployment to the second organizational entity, modifying the first quantity based on the second quantity, and generating, by using a processor of the computer system, an optimized deployment scheme based on the first quantity, the modified first quantity, and the second quantity.

20 Claims, 4 Drawing Sheets

FIG. 4

# SYSTEMS AND METHODS FOR EXECUTING A DATABASE QUERY TO PERFORM MULTI-LEVEL DEPLOYMENT

BACKGROUND

1. Relevant Field

Systems and methods consistent with the present invention generally relate to the management of data, particularly within databases. More particularly, systems and methods consistent with the invention relate to executing a database query to perform multi-level deployment based on business requirements of various organizations.

2. Background Information

Businesses and other organizations generate and/or receive a variety of data items and electronic information (broadly referred to hereafter as "business data") during the course of their operation. The business data may be generated by and/or received from various entities located in different regions and/or countries. To organize and manage operations of the organization, different departments of an organization may generate different types of data objects based on the business data.

Figure 1:
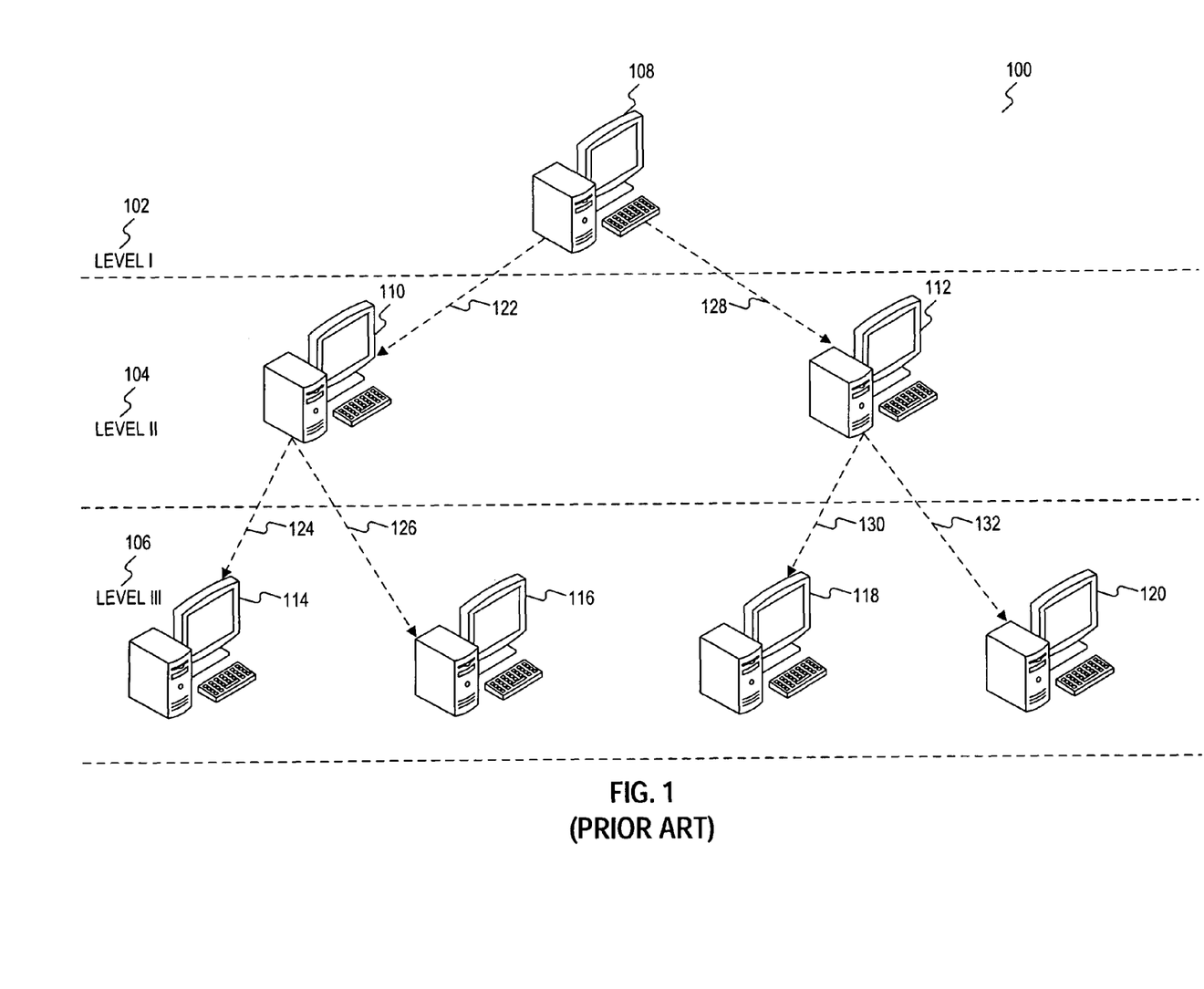
FIG. 1 illustrates a multi-layered system executing a conventional deployment process.

A conventional system and method for processing replenishment order received from various hierarchically arranged units of an organization may include a level-by-level analysis and deployment of goods, products, computing resources, and/or similar resources that may be required to complete business task. For example, FIG. 1 illustrates a multi-layered system of an organization 100 that may include hierarchically arranged computers for execution of a conventional deployment process. Organization 100 may include three levels 102 (LEVEL I), 104 (LEVEL II), and 106 (LEVEL III) and the levels may include nodes representing different entities involved during a deployment process. For example, node 108 may include a computer located in a distribution center of organization 100. Nodes 110 and 112 may include computers located in distribution centers of organization 100, and nodes 114, 116, 118, and 120 may include computers located in warehouses of organization 100. Layers 102, 104, and 106 may also include additional apparatuses and databases (not shown).

Node 108 in level 102 may receive and/or retrieve data from various nodes in lower levels. For example, node 114 may generate and send a data object to node 110 to indicate that a quantity $q_1$ of product P is required at node 114. Similarly, node 116 may generate and send a data object to node 110 to indicate that a quantity $q_2$ of the product P is required at node 116. Further, based on business processes performed in layer 104, node 110 may also require a quantity $q_3$ of the product P.

During execution of a conventional deployment process, node 108 may compute and/or receive from node 110 a quantity $q_{sum}$ of product P. The quantity $q_{sum}$ may identify a number indicating a sum of quantities $q_1$, $q_2$, and $q_3$, and node 108 may deploy and/or distribute a quantity $q_{deployed}$ of product P directly to node 110. The quantity $q_{deployed}$ may equal the quantity $q_{sum}$, and the deployment may be represented by, for example, path 122. Upon receipt of quantity $q_{deployed}$ of product P, node 110 may perform additional computations to keep quantity $q_3$ of product P; send quantity $q_1$ of product P to node 114 via path 124; and send quantity $q_2$ of product P to node 116 via path 126. Additional quantities of the product P may also be distributed from node 108 to nodes 112, 118, and 120 via paths 128, 130, and 132.

Thus, the conventional deployment process includes a level-by-level and indirect deployment where a node in a higher level deploys products to a node in a level directly below the higher level even if the node in the lower level does not require the entire quantity of the product itself. Further, additional processing steps like goods receipts processing may need to be performed in the lower level for additional deployment in even more lower levels. Due to a level-by-level deployment, goods and/or products may arrive at their destination after delays and their deployment may require the implementation of redundant and resource intensive processing steps, thus increasing the time and cost for business operations.

In view of the foregoing, it is desirable to provide methods and systems for reducing the time and processing steps required to deploy goods. For example, there is a need for an improved method and system to execute a database query to perform multi-level deployment in an organization.

SUMMARY

Consistent with embodiments of the present inventions, systems, methods and computer readable media are disclosed for generating an optimized deployment scheme.

Embodiments and implementations consistent with the invention provide a method for generating an optimized deployment scheme. The method may include generating a request identifying a type of resource requested by hierarchically arranged organizational entities including a first organizational entity located at a first level and a second organizational entity at a second level; executing a database query to retrieve business data corresponding to the first and second organizational entities; determining, based on the business data, a first quantity and a second quantity, the first quantity identifying a quantity of the resource available for deployment to the first organizational entity, and the second quantity identifying a quantity of the resource available for deployment to the second organizational entity; modifying the first quantity based on the second quantity; and generating, by using a processor of the computer system, an optimized deployment scheme based on the first quantity, the modified first quantity, and the second quantity.

In another embodiment consistent with the present invention, there is provided a system of generating an optimized deployment scheme. The system may include a memory device having instructions; and a processor executing the instructions to perform the steps of generating a request identifying a type of resource requested by hierarchically arranged organizational entities including a first organizational entity located at a first level and a second organizational entity at a second level; executing a database query to retrieve business data corresponding to the first and second organizational entities; determining, based on the business data, a first quantity and a second quantity, the first quantity identifying a quantity of the resource available for deployment to the first organizational entity, and the second quantity identifying a quantity of the resource available for deployment to the second organizational entity; modifying the first quantity based on the second quantity; and generating, by using a processor of the computer system, an optimized deployment scheme based on the first quantity, the modified first quantity, and the second quantity.

Consistent with another embodiment of the present invention, there is provided a computer-readable storage medium comprising instructions, which when executed on a processor, cause the processor to perform a method of generating an optimized deployment scheme. The method may include generating a request identifying a type of resource requested by hierarchically arranged organizational entities including a first organizational entity located at a first level and a second organizational entity at a second level; executing a database query to retrieve business data corresponding to the first and second organizational entities; determining, based on the business data, a first quantity and a second quantity, the first quantity identifying a quantity of the resource available for deployment to the first organizational entity, and the second quantity identifying a quantity of the resource available for deployment to the second organizational entity; modifying the first quantity based on the second quantity; and generating, by using a processor of the computer system, an optimized deployment scheme based on the first quantity, the modified first quantity, and the second quantity.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and in the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention generally relate to optimizing the deployment process by using streamlined supply chain management techniques. Exemplary deployment engines that may be used in systems consistent with the invention include those offered by SAP AG, such as SAP Supply Chain Management (SCM) that may facilitate quick exchange of information between manufacturing and supply networks to support adjustment of business operations based on changing customer demands. SAP SCM may transform a linear, sequential supply chain into a responsive supply network to enable demand-driven companies to share knowledge, and adapt their inventories based on changing market conditions.

Figure 2:
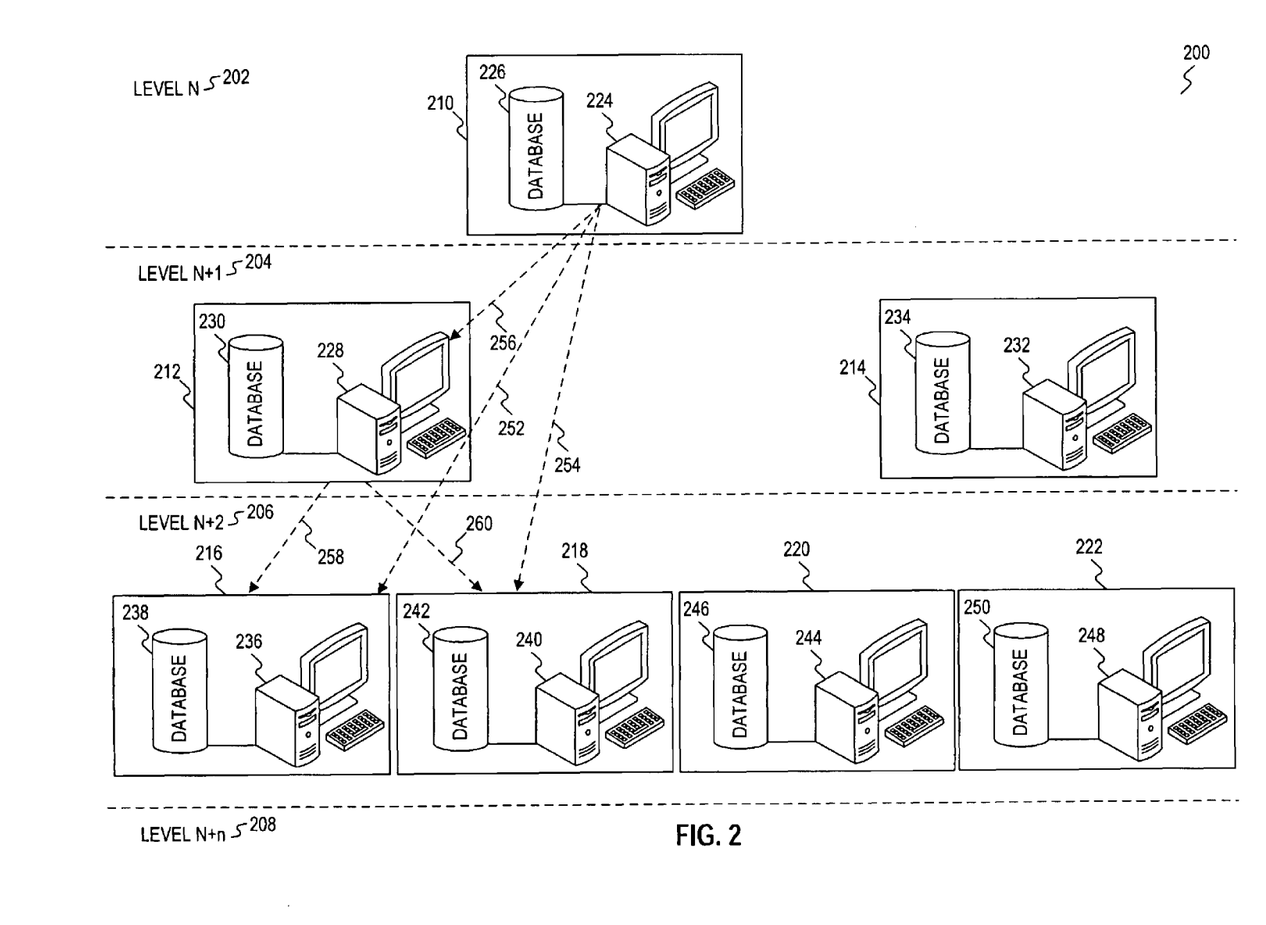
FIG. 2 is a block diagram illustrating an exemplary multi-layered system executing a deployment process, consistent with the present invention.

For example, as shown in FIG. 2, an exemplary system 200 may be used for executing a deployment process that may be implemented in one or more business organizations. As shown in FIG. 2, system 200 may include N levels 202, 204, 206, and 208. Level 202 may be "LEVEL N," level 204 may be "LEVEL N+1," level 206 may be "LEVEL N+2," and level 208 may be "LEVEL N+n." Levels 202, 204, 206, and 208 may include nodes 210, 214, 216, 218, 220, and 222 that may represent different entities involved during a deployment process. Nodes 210, 214, 216, 218, 220, and 222 may represent different units and/or departments of a single organization and/or may include different organizations that may be located in different locations.

Nodes 210, 214, 216, 218, 220, and 222 may include various apparatuses and devices that may used to perform various business operations. For example, node 210 may include a computer 224 that may be linked to a database 226; node 212 may include a computer 228 that may be linked to a database 230; node 214 may include a computer 232 that may be linked to a database 234; node 216 may include a computer 236 that may be linked to a database 238; node 218 may include a computer 240 that may be linked to a database 242; node 220 may include a computer 244 that may be linked to a database 246; and node 222 may include a computer 248 that may be linked to a database 250.

As is described in further detail below with respect to FIG. 3, computers 224, 228, 232, 236, 240, 244, and 248 may be implemented by using any types of user devices, and databases 226, 230, 234, 238, 242, 246, and 250 may be implemented by using one or more data repositories such that the databases may be consolidated in one location. Further, computers 224, 228, 232, 236, 240, 244, and 248 and 250 may share one or more databases instead of being assigned to separate databases, as is illustrated in FIG. 2.

Node 210 may represent a distribution center of an organization that may be responsible for managing inventory of the organization. Computer 224 and database 226 may be used to perform various business operations in the distribution center such as the processing of a BOM, a replenishment order, and/or a deployment request. Nodes 212 and 214 may represent additional distribution centers of an organization. Computers 228 and 232, and databases 230 and 234, may be used to perform various business operations in the distribution centers. Nodes 216, 218, 220, and 222 may represent warehouses of an organization. Computers 236, 240, 244, and 248, and databases 238, 242, 246, and 250, may be used to perform various business operations in the warehouses.

During business operations computers 226, 230, 234, 238, 242, 246, and 250 may continuously store information and/or data objects in databases 226, 230, 234, 238, 242, 246, and 250. The stored data may include information indicating the location of a corresponding node, quantities of different products, goods, computing resources, processor, network, and/or memory capacities, and/or similar resources (referred to hereinafter as "products") that may be required for implementation of a business process at a corresponding node, predetermined business criteria and threshold values that may be used to determine an optimized path for deployment of products, and/or additional information to be used by system 200.

During business operations, nodes 210, 212, 214, 216, 218, 220, and 222 may exchange information with each other to perform various tasks. For example, node 210 may receive and/or retrieve data from computers and/or databases of various nodes in lower levels. The data may be a data object, and/or similar information identifying a quantity and type of product required in a corresponding node. Node 210 may use this information to determine an optimized path and process for deployment and distribution of a product in various nodes.

Based on various business operations being executed in node 216, computer 236 may generate and store, in database 238, information indicating that a quantity $q_1$ of product P is required at node 216. Similarly, computer 240 may generate and store, in database 242, information indicating that a quantity $q_2$ of product P is required at node 218. Computer 228 may also generate and store, in database 230, information indicating that a quantity $q_3$ or $q_{rem}$ of product P is required at node 212. Quantity $q_3$ may be a quantity of product P that may be required at node 212 when node 212 may be used during indirect deployment and quantity $q_{rem}$ may be a quantity of product P that may be required at node 212 when system 200 may perform direct deployment of product P. For example, $q_3$ may be a sum of quantities $q_1$, $q_2$, and $q_{rem}$, and, during indirect deployment, node 210 may send the quantity $q_3$ of product P to node 212, and node 212 may be responsible for deploying quantities $q_1$ and $q_2$ of product P to nodes 216 and 218, respectively. Alternatively, during direct deployment, node 210 may directly send the quantities $q_{rem}$, $q_1$, and $q_2$ of product P to nodes 212, 216, and 218, respectively. Computers 244, 248, and 232 may also store similar information in corresponding databases 246, 250 and 234, respectively. Further, computers (not shown) in level 208 may also store similar information in corresponding databases (not shown).

During execution of a deployment process, node 210 may receive a request for deployment of certain quantities of product P to nodes in levels 204, 206, and 208. The request may include a quantity required by node 212 in level 204 and/or may include specific quantities required by nodes 212, 216, 218, and additional nodes in level 208. Alternatively, the request may only identify a type of the product P without identifying the required quantities. Prior to distribution of product P, computer 224 may generate and send database queries to databases 226, 230, 238, 242, and databases in level 208 to retrieve data that may used to determine an optimized deployment scheme for the distribution of product P. The retrieved data may include the quantities of product P required by specific nodes in the lower levels, the location of the corresponding nodes, business criteria and threshold values.

For example, instead of simply deploying quantity $q_3$ of product P to node 212, computer 224 may determine the exact quantity $q_{rem}$ required by node 212 after node 212 fulfills deployment requests from nodes 216 and 218. Similarly, instead of simply deploying quantities $q_1$ and $q_2$ of product P to nodes 216, and 218, via node 212, computer 224 may determine the quantities of product P that may be required by nodes in layer 208 before deploying a quantity of P. Thus, when deploying a product P from "LEVEL N," to "LEVEL N+1," computer 224 may determine the quantities required by nodes in lower levels including "LEVEL N+2" up to "LEVEL N+n" before determining an optimized deployment scheme for the product P. The determination may be based on execution of a recursive algorithm that may determine all the quantities until there are no lower levels and/or there are lower levels that may not require a quantity of the product P.

After receiving and/or retrieving data from at least databases 226, 230, 238, and 242, and computing the quantities of product P required by nodes at lower levels, computer 224 may generate an optimized deployment scheme. The optimized deployment scheme may determine whether it is more cost-effective to deploy quantities of product P on a level-by-level basis or whether it is more cost-effective to deploy quantities of product P by skipping levels. For example, based on the locations of nodes 212, 216, and 218, computer 224 may determine the costs of deploying quantity $q_1$ of product P directly to node 216 via a path 252, deploying quantity $q_2$ of product P directly to node 218 via a path 254, and deploying quantity $q_{rem}$ of product P directly to node 212 via a path 256. Further, computer 224 may determine the cost of deploying quantity $q_3$ of product P to node 212 via path 256, and the costs of deploying quantities $q_1$ and $q_2$ of product P to nodes 216 and 218 from node 212 and via paths 258 and 260, respectively. Computer 224 may then compare the calculated costs and may determine an optimized deployment scheme factoring the results of the comparison. Based on business requirements, computer 224 may choose the least expensive optimized deployment scheme or may choose the more expensive optimized deployment scheme if the quantities of products reach nodes 212, 216, and 218 earlier using the more expensive optimized deployment scheme.

Computer 224 may also generate an optimized deployment scheme based on threshold values that may be stored in database 226. The threshold values may be predetermined values generated based on cost-estimates and business requirements and/or may be generated run-time based on various operations in levels 204, 206, and 208. For example, a threshold value $T_1$ may represent a quantity of product P such that when the quantity $q_{rem}$ of product P is determined to be less than threshold value $T_1$ computer 224 may implement an optimized deployment scheme that may include deploying quantity $q_3$ of product P to node 212 via path 256, and then deploying quantities $q_1$ and $q_2$ of product P to nodes 216 and 218 via paths 258, and 260.

Alternatively, when the quantity $q_{rem}$ of product P is determined to be greater than threshold value $T_1$ computer 224 may implement an optimized deployment scheme that may include deploying quantities $q_1$, $q_2$, and $q_{rem}$ via paths 252, 254, and 256, respectively. Additional, threshold values $T_2$ and $T_3$ corresponding to nodes 216 and 218 may also be used to generate an optimized deployment scheme. Accordingly, when $q_{n+1} > T_1$ a quantity $q_{deployed}$ of product P required at node 212 may be equal to $q_{rem}$, and when $q_{n+1} < T_1$ a quantity $q_{deployed}$ of product P required at node 212 may be equal to $q_3$. Computer 224 may also generate optimization schemes for deployment of various products to nodes 214, 220, 222, and to nodes in level 208, by performing similar computations as may be performed with respect to the deployment of product P to nodes 212, 216, and 218.

As explained above, system 200 is an exemplary system, and deployment processes implemented by system 200 may also be implemented by a single device. For example, the deployment processes may be implemented by computer 224 that may use information stored in internal memory of computer 224 to determine deployment quantities and deployment decisions. Computer 224 may be included in Level N of an organization, such that N may represent any level in a hierarchical structure. A processor of computer 224 may execute instructions to generate a first deployment decision that may be a virtual deployment decision and may indicate, for example, that 100 pieces of a product P may need to be deployed from node 210 in Level N to node 212 in level N+1. In this embodiment, node 212 may not include computer 228 and database 230. The first deployment decision may be a deployment from Level N to Level N+1 and may be generated based on an available quantity of the product P and deployment data stored, generated, and/or received by computer 224. Computer 224 may generate a similar deployment decision for node 214.

Subsequent to generation of the first deployment decision, computer 224 may generate a second deployment decision that may indicate, for example, that 10 pieces of the product P may need to be deployed from node 212 in Level N+1 to node 216 in Level N+2, and 20 pieces of the product P may need to be deployed from node 212 in Level N+1 to node 218 in Level N+2. In this embodiment, node 216 may not include computer 236 and database 238, and node 218 may not include computer 240 and database 242. The second deployment decision may be a virtual deployment decision and may be generated by using the quantity 100 of product P, determined to be deployed from node 310 to node 312 in the first deployment decision, as an input parameter during execution of instructions by a processor in computer 224.

Once the second deployment decision has been generated, computer 224 may adapt, change, and/or modify the first deployment decision based on the results of the second deployment decision. For example, computer 224 may determine that out of the 100 pieces of product P that need to be deployed to levels N and N+1, 10 pieces need to be deployed to node 216 in Level N+2; 20 pieces need to be deployed to node 218 in Level N+2 and only 70 pieces need to be deployed to node 212 in Level N+1. Computer 224 may then adapt the first deployment decision that may initiate direct deployment of 70 pieces of product P to node 212, from node 210, along path 356, 10 pieces along path 252 and 20 pieces along path 254.

The adaption of the first deployment decision may also indicate the use of indirect deployment or a combination of direct and indirect deployment based on business requirements of an organization having computer 224. Once the adaption of the first deployment decision is done, the deployment process may move to node 216, such that computer 224 may determine if any quantity of product P needs to be deployed to nodes in a level lower than node 216. For example, if n=3, computer 224 may determine if a quantity of product P needs to be deployed from node 216 to a node in level N+3. Computer 224 may implement the procedure described above for deployment between levels N, N+1, and N+2, to execute the deployment process needed to determine a deployment between levels N, N+2, and N+3. Thus, computer 224 executes a recursive process that generates virtual deployment decisions to adapt the first deployment decisions, and to generate a final optimized deployment scheme.

Figure 3:
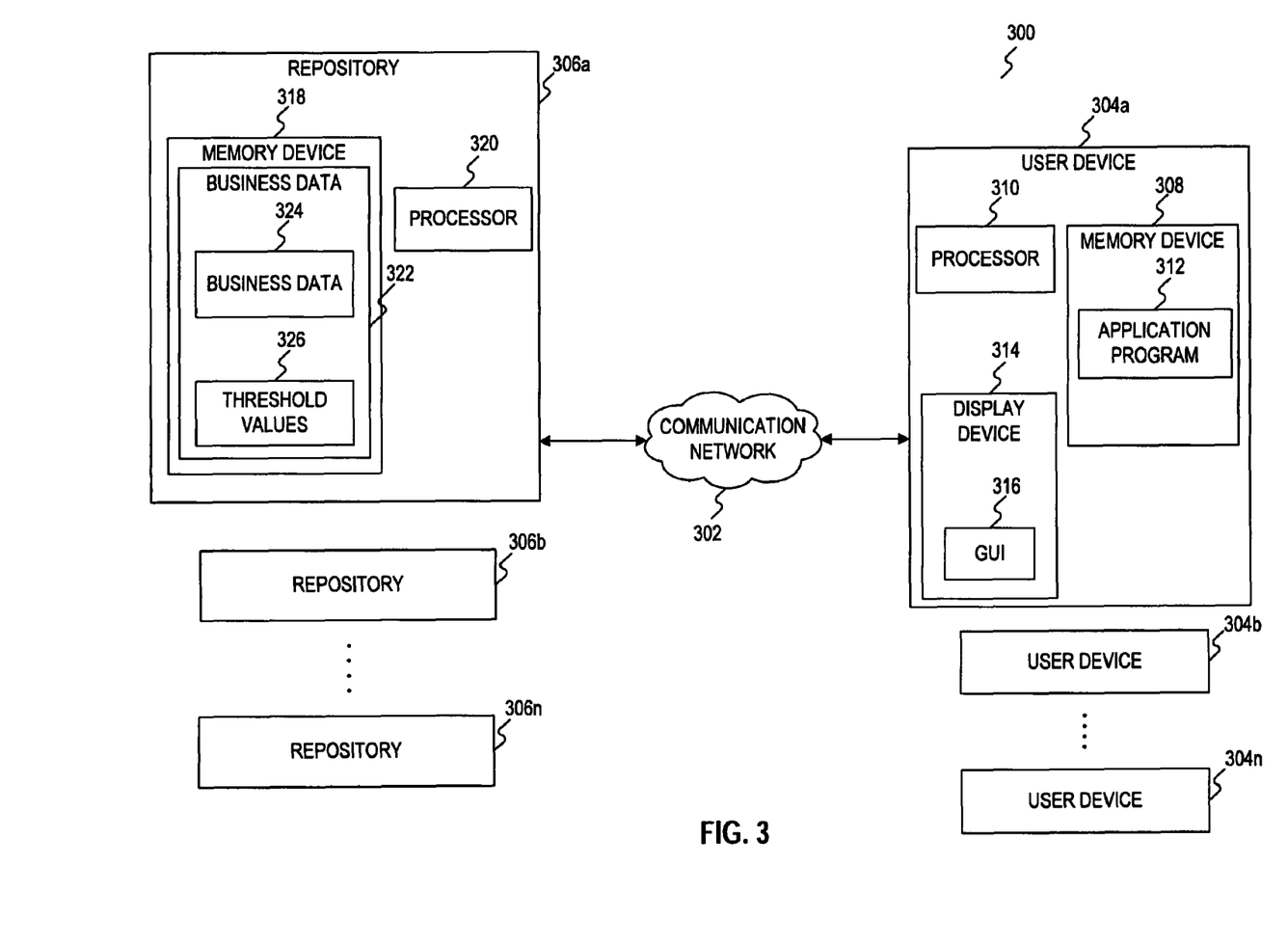
FIG. 3 is a block diagram illustrating nodes of an exemplary multi-layered system, consistent with the present invention.

FIG. 3 illustrates a detailed diagram of nodes of an exemplary multi-layered system 300. As shown in FIG. 3, system 300 includes a communication network 302 that facilitates communication between a plurality of nodes 304a-n and 306a-n. Communication network 302 may include one or more network types, such as a wide-area network (WAN), a local-area network (LAN), or the Internet. Communication network 302 may operate by wireline and/or wireless techniques and may use transmission control protocol/internet protocol ("TCP/IP") or any other appropriate protocol to facilitate communication between nodes 304a-n and 306a-n of system 300. Network connections between the nodes of system 300 may be established via Ethernet, telephone line, cellular channels, or other transmission media.

Each node of system 300 may comprise a combination of one or more application programs and one or more hardware components. For example, application programs may include software modules, sequences of instructions, routines, data structures, display interfaces, and other types of structures that execute operations of the present invention. Further, hardware components may include a combination of Central Processing Units (CPUs), buses, memory devices, storage units, data processors, input devices, output devices, network interface devices, and other types of components that will become apparent to those skilled in the art.

Nodes 304a-n may correspond to, for example, one or more of computers 224, 228, 232, 236, 240, 244, and 248 of system 200, and nodes 306a-n may correspond to, for example, one or more of databases 226, 230, 234, 238, 242, 246, and 250 of system. Consistent with an embodiment of the present invention, nodes 304a-n and 306a-n of system 300 may be respectively implemented by using user devices and repositories. User device 304a may be an appropriate device for sending, receiving, processing, and presenting data. For example, user device 304a may include personal computers, workstations, mainframe computers, notebooks, global positioning devices, and handheld devices such as cellular phones and personal digital assistants. User devices 304a-n may be arranged in a hierarchical manner and/or at different levels and may be located at different departments of an organization and/or may be located in different organizations.

As is illustrated in FIG. 3, user device 304a may include a memory device 308 and a processor 310. Memory device 308 may be used to store instructions, such as an application program 312, which may be executed by processor 310 to cause user device 304a to implement a plurality of operations. Application program 312 may be used to implement a supply chain management engine such as SAP SCM, and processor 310 may cause user device 304a to manage inventories of products. User device 304a may also include a display device 314 that may be used to implement a graphical user interface (GUI) 316 to allow a user of user device 304a to interface with at least a portion of system 300. User device 304a may also include additional components such as input and output devices (not shown). User devices 304b-n may also include memory devices, processors, and application programs as described above with respect to user device 304a.

User devices 304a-n may communicate with repositories 306a-n via communication network 302. Repositories 306a-n may be used to classify, manage, and store data. Repositories 306a-n may be located in different regions and may comprise a database management system such as a Business One database system from SAP AG. Repository 306a may include a memory device 318 and a processor 320. Memory device 318 may comprise business data 322 that may include business criteria 324 and threshold values 326. Business criteria 324 may include information identifying locations of user devices 304a-n and repositories 306a-n, information identifying organizational costs of sending products to locations represented by user devices 304a-n, inventory information including quantities of different products that may be required at particular locations in the organization, business requirements, and/or other additional information that may be used to generate an optimized deployment scheme.

Threshold values 326 may be predetermined values or may be generated run-time to indicate quantities corresponding to products that may be used to generate an optimized deployment scheme. Memory device 318 may also include application programs (not shown) that may be executed on processor 320 for management and maintenance of data stored in memory device 318. Repositories 306b-n may also include memory devices, application programs, and processors. Communication between user devices 304a-n and repositories 306a-n may include sending data, such as requests and queries to repository 306a, and receiving data, such as extracted business criteria and threshold values, from repository 306a.

Although the exemplary embodiment of system 300 is described as having particular components arranged in a particular manner, one skilled in the art will appreciate that system 300 may include additional or fewer components that may be arranged differently. For example, user devices 304a-n and repositories 306a-n may include additional processors and/or memory devices. System 300 may be implemented in a client/server arrangement, and/or with a single central computer connected to a central repository storing business criteria and threshold values. Memory devices 308 and 318 may include all forms computer-readable storage mediums such as non-volatile or volatile memories including, by way of example, semiconductor memory devices, such as EPROM, RAM, ROM, DRAM, EEPROM, and flash memory devices; magnetic disks such as internal hard disks and removable disks; magneto-optical disks; and CD-ROM disks.

Consistent with an embodiment of the invention, user device 304a may communicate with user devices 304b-n using communication network 302 to receive and/or calculate the quantities of various products that may be required for business processes being performed by organizational entities represented by user devices 304b-n. User device 304a may generate and send a query to one or more repositories 306a-n via a communication network 302 to retrieve business criteria 324 and/or threshold values 326 corresponding to the organizational entities represented by user devices 304b-n. Based on the retrieved data, user device 304a may execute application program 312 on processor 310 to generate an optimized deployment scheme that may indicate paths that may be used to ship quantities of requested products. The optimized deployment scheme may include selecting paths that may satisfy business requirements by being cost-effective and may include skipping levels as is disclosed in with respect to system 200 above.

Figure 4:
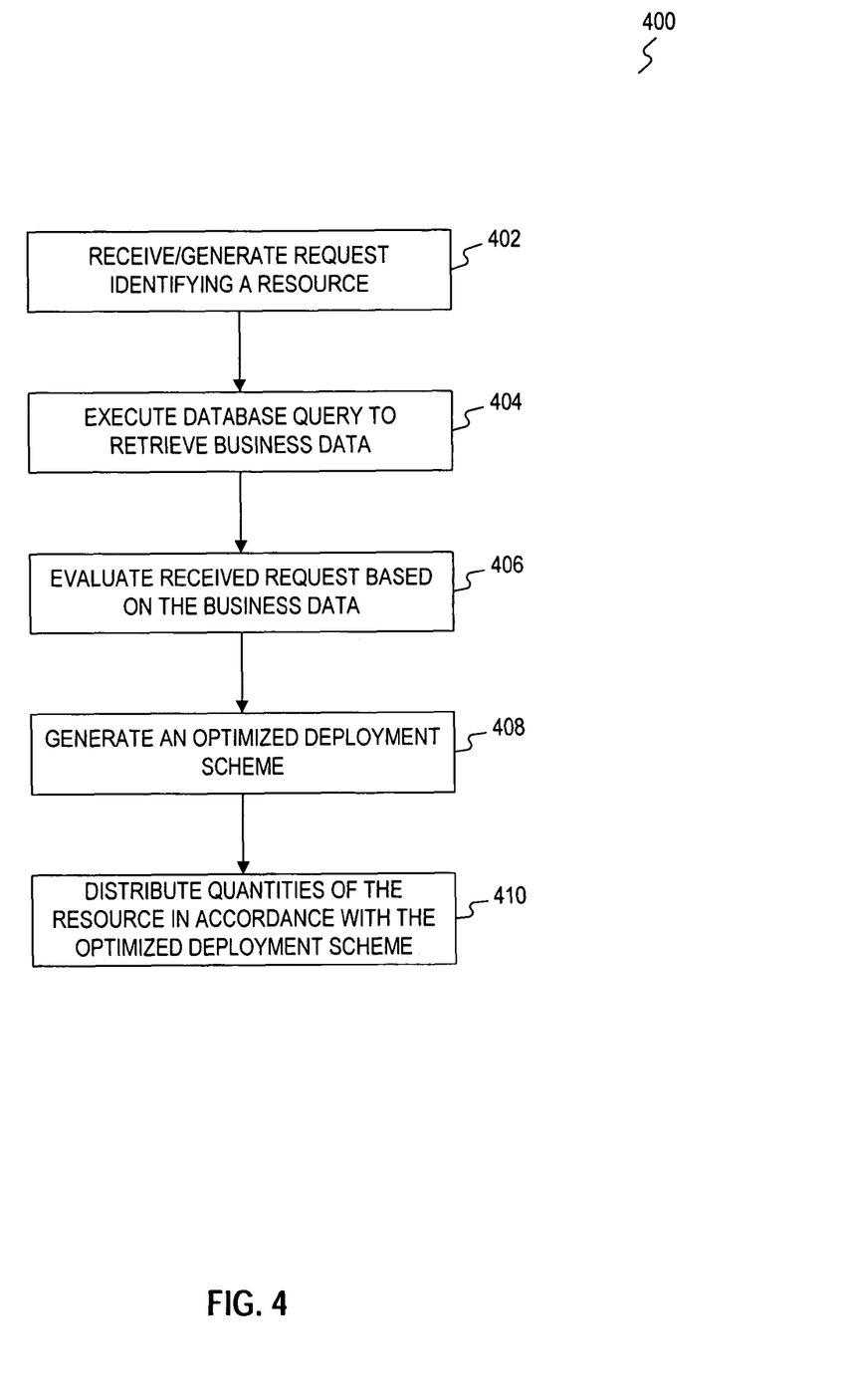
FIG. 4 is a flowchart illustrating an overview of an exemplary deployment method, consistent with the present invention.

FIG. 4 is a flow diagram of a method 400 for generating an optimized deployment scheme, consistent with the invention. Method 400 may represent operation of computer 224 or user device 304a. In step 402 a resource allocation request to receive quantities of a resource may be received and/or generated. The request may be received from various organizational entities and may include a type and quantity of the requested resource. The resource may include a product, good, service, computing resource, processor, network, and/or memory capacity, and/or similar resources required to perform business tasks. Alternatively, the request may only identify a type of the requested resource, and the quantities may be determined by executing database queries to retrieve business data identifying business requirements of the requesting organizational entities. Moreover, determined quantities of products to be deployed to a node in a higher level of a business organization may be modified, adapted, and/or changed based on determined quantities of products to be deployed to a node in a lower level of the business organization.

In step 404, database queries may be executed to retrieve business data including business criteria and threshold values corresponding to the requesting organizational entities. Next, in step 406, the received requests may be evaluated based on the business criteria, a threshold value, and the modified quantity values. The evaluation may include comparing the threshold values to the requested quantities and calculating the costs of sending the resources to the various organizational entities.

In step 408, an optimized deployment scheme may be generated that may identify the procedures and costs of sending the resource to the various organizational entities. The deployment scheme may include a deployment path that may be included after a selection of the deployment path from a plurality of available deployment paths. The selection may be based on an evaluation of the business data in step 406. Next, in step 410, the quantities of the resource may be distributed in accordance with the optimized deployment scheme generated in step 408, and the method ends. The distribution may include distributing modified and/or adapted quantities of the resource. Distributing the resource may include a level-by-level indirect distribution when comparison of the threshold value may indicate that the requested quantity is less than the threshold value. Further, the optimized deployment scheme may include distributing the resource directly by skipping levels when comparison of the threshold value may indicate that the requested quantity is greater than the threshold value. Distribution of the resource may also include sending the quantities by using the least expensive paths or the most expensive paths depending on the urgency with which the resource is required.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of generating an optimized deployment scheme, the method being implemented by a computer system and comprising:
    generating a request identifying a type of resource requested by hierarchically arranged organizational entities including a first organizational entity located at a first level and a second organizational entity at a second level;
    executing a database query to retrieve business data corresponding to the first and second organizational entities;
    determining, based on the business data, a first quantity and a second quantity, the first quantity identifying a quantity of the resource available for deployment to the first organizational entity, and the second quantity identifying a quantity of the resource available for deployment to the second organizational entity;
    modifying the first quantity based on the second quantity; and
    generating, by using a processor of the computer system, an optimized deployment scheme based on the first quantity, the modified first quantity, and the second quantity.

2. The method of claim 1, wherein the business data includes a first threshold value corresponding to the modified first quantity of the resource and a second threshold value corresponding to the second quantity of the resource.

3. The method of claim 2, further comprising comparing the first threshold value with the modified first quantity, and comparing the second threshold value with the second quantity, wherein a result of the comparison is used for selection of a type of deployment path included in the optimized deployment scheme.

4. The method of claim 3, wherein the computer system represents a third organizational entity at a third level that is higher than the first and second level in the hierarchical arrangement.

5. The method of claim 4, further comprising distributing the modified first quantity of the resource to the first organizational entity, and the second quantity of the resource to the second organizational entity based on the optimized deployment scheme, wherein the first level is higher than the second level in the hierarchical arrangement, and the second quantity of the resource is distributed directly from the third level to the second level on the deployment path when the second quantity is greater than the second threshold value.

6. The method of claim 4, further comprising distributing the first quantity of the resource to the first organizational entity, and the second quantity of the resource to the second organizational entity based on the optimized deployment scheme, wherein the first level is higher than the second level in the hierarchical arrangement, and when the second quantity is less than the second threshold value, the second quantity of the resource is distributed to the second level from the third level and through the first level on the deployment path such that the third organizational entity distributes the first quantity of the resource to the first organizational entity, and the first organizational entity distributes the second quantity to the second organizational entity.

7. The method of claim 1, further comprising distributing the modified first quantity of the resource to the first organizational entity, and the second quantity of the resource to the second organizational entity based on the optimized deployment scheme, wherein distributing the modified first quantity and the second quantity includes a level-by-level distribution.

8. The method of claim 1, wherein the business data includes business criteria identifying location information of the first and second organizational entities.

9. The method of claim 8, further comprising:
calculating, based on the business criteria, a cost of directly distributing the second quantity of the resource from a third organizational entity represented by the computer system to the second organizational entity; and
calculating, based on the business criteria, a cost of indirectly distributing the second quantity of the resource from the third organizational entity to the second organizational entity via the first organizational entity,
wherein generating the optimized deployment scheme includes indicating a level-by-level distribution for the second quantity of the resource or indicating a distribution including skipping the first level for distributing the second quantity of the resource, the indication being included based on the calculated costs.

10. The method of claim 1, wherein the business data includes a business requirement identifying a time frame within which the first and second quantities of the resource are requested to be distributed to the first and second organizational entities, respectively.

11. The method of claim 10, further comprising calculating, based on the business data, costs of implementing each of the plurality of deployment paths, wherein generating the optimized deployment scheme includes selecting one of a plurality of deployment paths having the highest or lowest cost.

12. The method of claim 1, further comprising:
selecting, from a plurality of types of deployment paths, a type of deployment path included in the optimized deployment scheme, wherein the selection is based on the business data; and
generating an instruction to deploy one of the first quantity, the modified first quantity and the second quantity along the selected type of deployment path.

13. A system of generating an optimized deployment scheme, comprising:
a memory device having instructions; and
a processor executing the instructions to perform the steps of:
generating a request identifying a type of resource requested by hierarchically arranged organizational entities including a first organizational entity located at a first level and a second organizational entity at a second level;
executing a database query to retrieve business data corresponding to the first and second organizational entities;
determining, based on the business data, a first quantity and a second quantity, the first quantity identifying a quantity of the resource available for deployment to the first organizational entity, and the second quantity identifying a quantity of the resource available for deployment to the second organizational entity;
modifying the first quantity based on the second quantity; and
generating, by using a processor of the computer system, an optimized deployment scheme based on the first quantity, the modified first quantity, and the second quantity.

14. The system of claim 13, wherein the business data includes a first threshold value corresponding to the modified first quantity of the resource and a second threshold value corresponding to the second quantity of the resource.

15. The system of claim 14, wherein the processor executes the instructions for comparing the first threshold value with the modified first quantity, and comparing the second threshold value with the second quantity, wherein a result of the comparison is used for selection of a type of deployment path included in the optimized deployment scheme.

16. The system of claim 15, wherein the system represents a third organizational entity at a third level that is higher than the first and second level in the hierarchical arrangement.

17. The system of claim 16, wherein the processor executes the instructions for distributing the modified first quantity of the resource to the first organizational entity, and the second quantity of the resource to the second organizational entity based on the optimized deployment scheme, wherein the first level is higher than the second level in the hierarchical arrangement, and the second quantity of the resource is distributed directly from the third level to the second level on the deployment path when the second quantity is greater than the second threshold value.

18. The system of claim 16, wherein the processor executes the instructions for distributing the first quantity of the resource to the first organizational entity, and the second quantity of the resource to the second organizational entity based on the optimized deployment scheme, wherein the first level is higher than the second level in the hierarchical arrangement, and when the second quantity is less than the second threshold value, the second quantity of the resource is distributed to the second level from the third level and through the first level such that the third organizational entity distributes the first quantity of the resource to the first organizational entity, and the first organizational entity distributes the second quantity to the second organizational entity on the deployment path.

19. The system of claim 13, wherein the processor executes the instructions for distributing the first quantity of the resource to the first organizational entity, and the second quantity of the resource to the second organizational entity based on the optimized deployment scheme, wherein distributing the first quantity and the second quantity includes a level-by-level distribution.

20. A computer-readable storage medium including instructions which, when executed on a processor, cause the processor to perform a method of generating an optimized deployment scheme, the method comprising:

generating a request identifying a type of resource requested by hierarchically arranged organizational entities including a first organizational entity located at a first level and a second organizational entity at a second level;

executing a database query to retrieve business data corresponding to the first and second organizational entities;

determining, based on the business data, a first quantity and a second quantity, the first quantity identifying a quantity of the resource available for deployment to the first organizational entity, and the second quantity identifying a quantity of the resource available for deployment to the second organizational entity;

modifying the first quantity based on the second quantity; and generating, by using a processor of the computer system, an optimized deployment scheme based on the first quantity, the modified first quantity, and the second quantity.

* * * * *